United States Patent [19]

Davis, Sr.

[11] Patent Number: 5,799,960
[45] Date of Patent: Sep. 1, 1998

[54] ROTATING SAFETY HANDLES FOR WHEELBARROWS

[76] Inventor: Eddie Charles Davis, Sr., 1235 Piazza La., Gilroy, Calif. 95020

[21] Appl. No.: 549,512

[22] Filed: Oct. 27, 1995

[51] Int. Cl.$^6$ ........................................................ B62B 1/18
[52] U.S. Cl. ................... 280/47.31; 280/47.315; 298/3; 16/DIG. 41
[58] Field of Search ..................... 280/655, 655.1, 280/47.17, 47.2, 47.3, 47.31, 47.315, 47.32; 16/111 R, 112; 74/DIG. 41, 543, 545; 298/3

[56] References Cited

U.S. PATENT DOCUMENTS

| 477,472 | 6/1892 | Thompson | 280/47.3 |
|---|---|---|---|
| 824,746 | 7/1906 | Schaffer | 16/111 R |
| 2,544,505 | 3/1951 | Kronhaus | 298/3 |
| 2,901,263 | 8/1959 | Van Loon, Jr. | 298/3 |
| 3,173,705 | 3/1965 | De Graff Du Puy | 280/47.31 |
| 3,833,262 | 9/1974 | Tasse | 298/3 |
| 4,471,996 | 9/1984 | Primeau | 298/3 |
| 4,674,355 | 6/1987 | Klein | 74/543 |
| 4,866,813 | 9/1989 | Dupont | 16/114 R |
| 4,951,956 | 8/1990 | Vittone | 280/47.31 |
| 5,153,966 | 10/1992 | Godwin | 16/111 R |

FOREIGN PATENT DOCUMENTS

| 1305786 | 8/1962 | France | 298/3 |
|---|---|---|---|
| 1188550 | 4/1970 | United Kingdom | 16/111 R |
| 1300339 | 12/1972 | United Kingdom | 280/47.32 |

Primary Examiner—Brian L. Johnson
Assistant Examiner—Frank Vanaman
Attorney, Agent, or Firm—David L. Volk

[57] ABSTRACT

A wheelbarrow handle mechanism comprising a pair of rotating grippable handles. Mounted perpendicular to the standard lifting shaft of a wheelbarrow is an axle mechanism protruding inward. An elongated, cylindrical handle is affixed rotatingly about the axle mechanism, and has an external gripping surface and an internal rotating surface. The internal rotating surface contacts bearings or other friction reducing mechanisms to allow the handle to freely rotate about the axle.

2 Claims, 2 Drawing Sheets

1
ROTATING SAFETY HANDLES FOR WHEELBARROWS

BACKGROUND OF THE INVENTION

1. Field of the Invention

The present invention relates generally to handles for wheelbarrows and, more particularly, to rotating hand grips for use with wheelbarrows to allow for dumping without readjustment or repositioning of the hands.

2. Description of the Related Art

Although wheelbarrows are in common usage everywhere the related art shows several examples of recent improvements. For example, U.S. Pat. No. 5,153,966 issued in the name of Godwin discloses a lifting handle attachment for wheelbarrows comprising essentially multi-grippable lifting handles attached to the normal shaft of a conventional wheelbarrow.

Also, in U.S. Pat. No. 4,471,996, issued in the name of Primeau, a wheelbarrow with pivoted handles is disclosed comprising a frame adapted to support a load to be carried having a rear end portion which pivots, allowing the bucket portion of the wheelbarrow to rest flat against the ground and thereby assisting the user in loading the wheelbarrow. However, such a device as disclosed in Primeau provides no useful function while engaging in dumping of the wheelbarrow.

Also known are other gripping handle mechanisms. Merely one example of such a device is disclosed in U.S. Pat. No. 4,866,813, issued in the name of Dupont, disclosing a load carrying attachment handle with attachment strap comprising essentially a grippable handle and a securing means for securing said handle to a load.

Despite these and other references, the related art fails to show significant improvements for wheelbarrow handles; and, the related art and non-related art grippable handle mechanisms in general failed to be useful if rotatable. However, in the unique application of a wheelbarrow a need has long been felt for providing an apparatus which aids the user in lifting and dumping a heavily loaded wheelbarrow.

SUMMARY OF THE INVENTION

It is therefore an object of the present invention to provide an improved handle mechanism for a wheelbarrow.

It is another object of the present invention to provide an improved handle mechanism for a wheelbarrow which aids the user in lifting and dumping a wheelbarrow.

It is a feature of the present invention to provide an improved handle mechanism for a wheelbarrow having rotating grippable handles.

Briefly described according to one embodiment of the present invention a wheelbarrow handle mechanism is disclosed comprising a pair of rotating grippable handles. Mounted perpendicular to the standard lifting shaft of a wheelbarrow is an axle mechanism protruding inward. An elongated, cylindrical handle is affixed rotatingly about the axle mechanism, and has an external gripping surface and an internal rotating surface. The internal rotating surface contacts bearings or other friction reducing mechanisms to allow the handle to freely rotate about the axle.

In an alternate embodiment of the preferred invention a single axle connects the two inner sections of the standard lifting shafts, and has a single rotating handle mounted there to and rotates freely about said axle.

An advantage of the present invention is that it relieves the awkward condition created when dumping heavy loads.

2

Another advantage of the present invention is said that it relieves strains and stresses on a user's wrists that would otherwise be encountered when using a conventional wheelbarrow.

Yet another advantage of the present invention is that a user can haul and dump using an otherwise conventional wheelbarrow without readjusting or repositioning of the hands.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
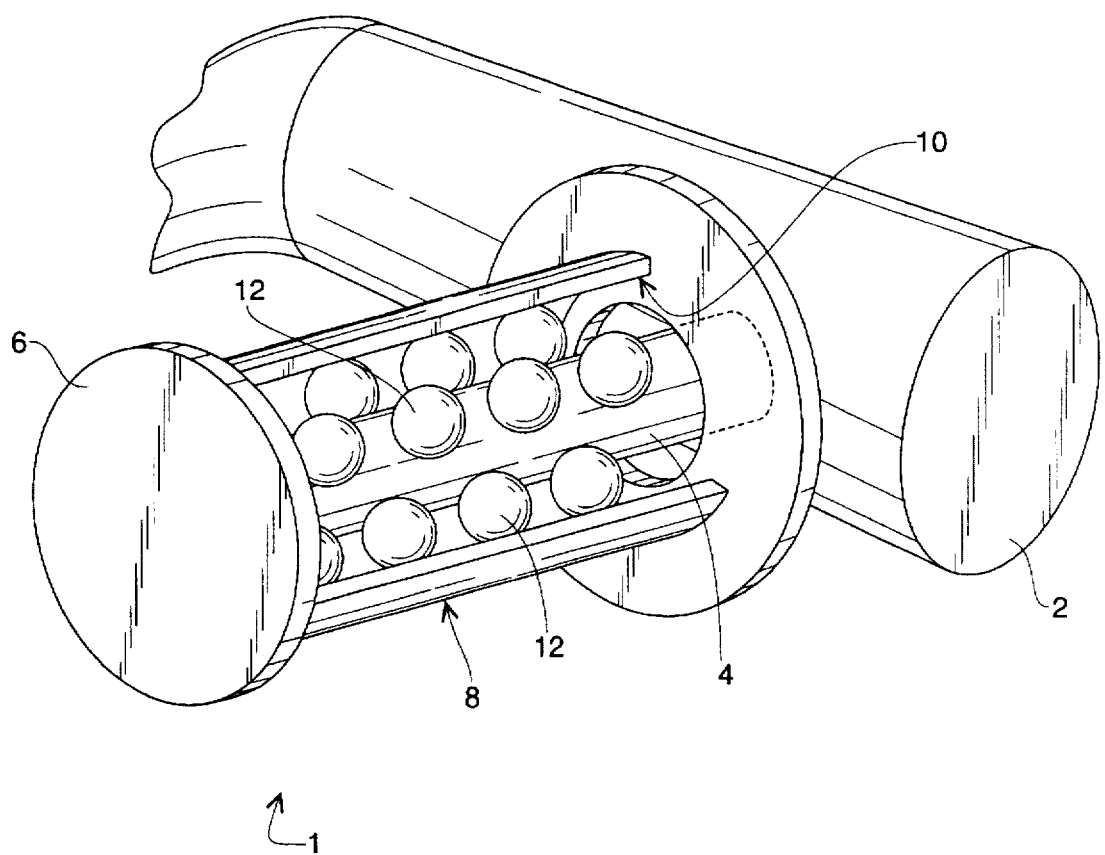
FIG. 1 is a cutaway perspective view of one embodiment of the present invention.

Referring now to FIG. 1, a wheelbarrow safety handle 1 is shown, according to one embodiment of the present invention, mounting to a conventional shaft 2 of a conventional wheelbarrow. Mounted in a perpendicular orientation on said shaft 2 in an orientation parallel to standard user is an elongated axle 4. Mounted onto said axle 4 in a rotating manner is a rotating grip 6. The rotating grip 6 is generally elongated and generally cylindrical, having an outer grippable surface 8 and an inner surface 10. In its preferred embodiment a series of friction reducing bearings 12 are mounted between the inner surface 10 of the rotating grip 6 and the axle 4 to aid in the free rotation of the rotating grip 6 even when the wheelbarrow is heavily loaded.

Figure 2:
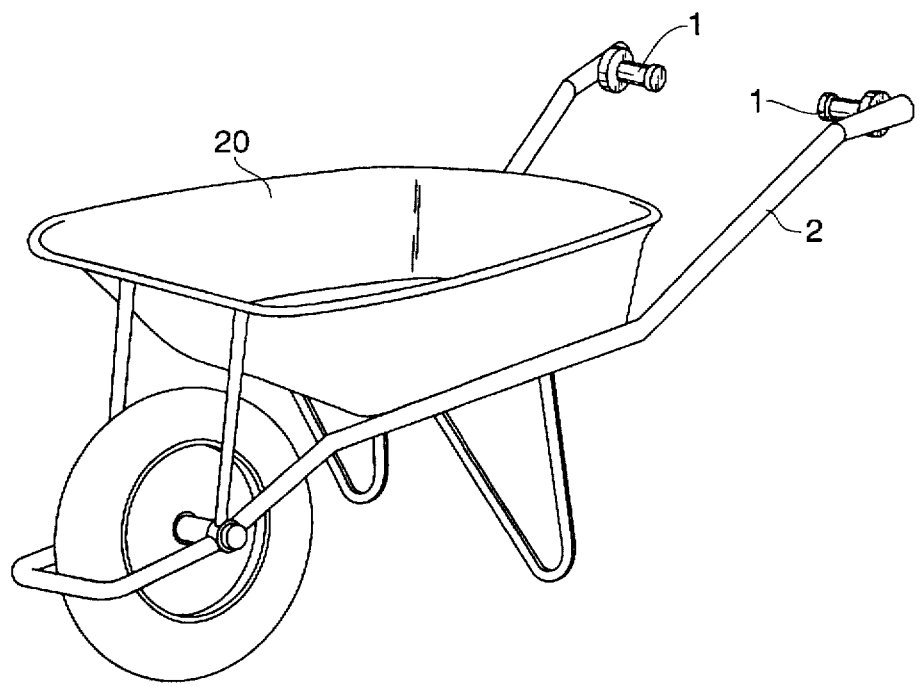
FIG. 2 is a perspective view thereof utilized with a standard wheelbarrow.

Referring to FIG. 2, the embodiment of the present invention best described in FIG. 1 is shown in use with a standard wheelbarrow 20. As shown, a pair of such handles 1 is mounted one to each shaft handle 2 of the wheelbarrow in a perpendicular manner facing inward toward each other.

Figure 3:
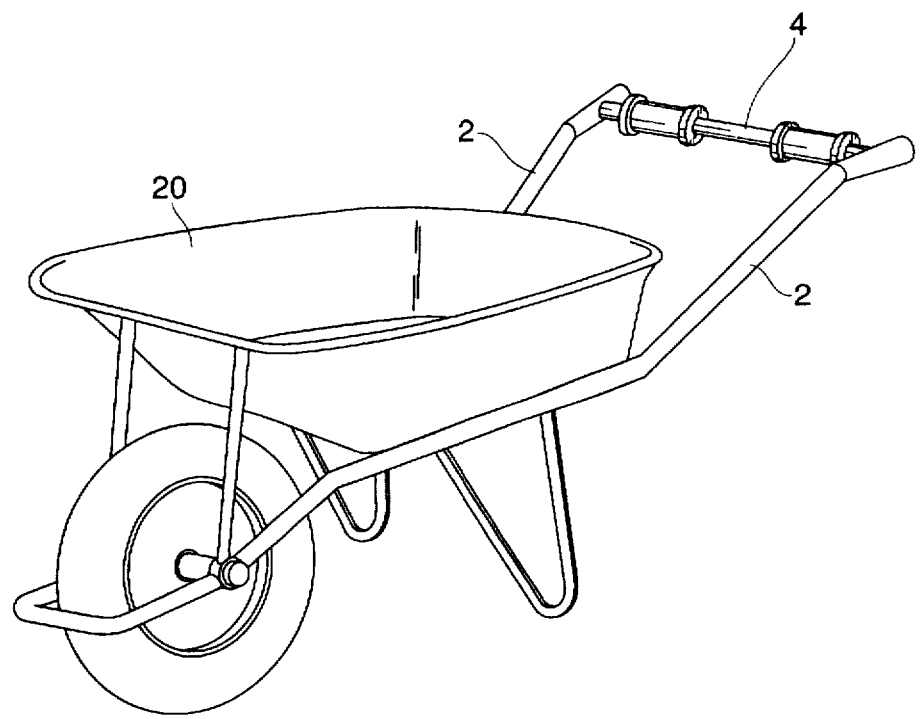
FIG. 3 is an alternate embodiment thereof in use with a standard wheelbarrow.

In an alternate embodiment shown in FIG. 3, a single axle 4 is extended and connects both shafts 2 of the wheelbarrow 20. In such a configuration a single extended rotating handle or a pair of independently rotating shaft handles of similar design and construction as shown in FIG. 1 can be mounted at any point along the axle 4. It is currently envisioned that these various embodiments would have particular advantages under various usage conditions. For example, the embodiment shown in FIG. 2 would be more adaptable toward heavy usage and in carrying greater loads due to the fact that the user can position himself closer inward toward the load thereby increasing his leverage. The embodiment described in FIG. 3, however, is envisioned to limit the users low carrying capability due to the requirement of the user standing totally behind the handles and is more likely adaptable to the lifting and carrying of lighter loads.

2. Operation of the Preferred Embodiment

To use the present invention in accordance with either embodiment the user grips the handles 2 in the same manner as normal. The rotating handles 2 are gripped in the same manner as a weight lifter would grab a barbel. When the user desires to dump the wheelbarrow load the user merely raises the handles 2 to position the wheelbarrow in a dumping position without the need of re-gripping or repositioning one's hands.

While the fore going description is included to illustrate the operation of the preferred embodiment and is not meant to limit the scope of the invention. There is other adaptations, configurations and embodiments are currently envisioned therefore the scope of the invention is to be limited only by the following claims.

What is claimed is:

1. A wheelbarrow which permits a user to haul and dump said wheelbarrow without readjusting or repositioning of the user's hands, the wheelbarrow comprising:

a hopper;

at least one wheel attached to the hopper;

two shafts extending away from the hopper;

two rotating handle assemblies;

each of the shafts having one of the handle assemblies attached thereto;

each of said handle assemblies comprising an elongated axle mounted in a substantially perpendicular fashion to said shaft;

each of said handle assemblies further comprising an elongated grip which shares a common longitudinal axis with said axle and which is mounted in such a manner as to be rotatable about said common longitudinal axis; and the grips directed inward toward each other.

2. The wheelbarrow as described in claim 1, each of said handle assemblies further including ball bearings mounted between an inner surface of said grip and said axle.

* * * * *